C. BUSWELL.
Harrow.
No. 163,736.　　　　　　　　　　Patented May 25, 1875.
Fig. 2.
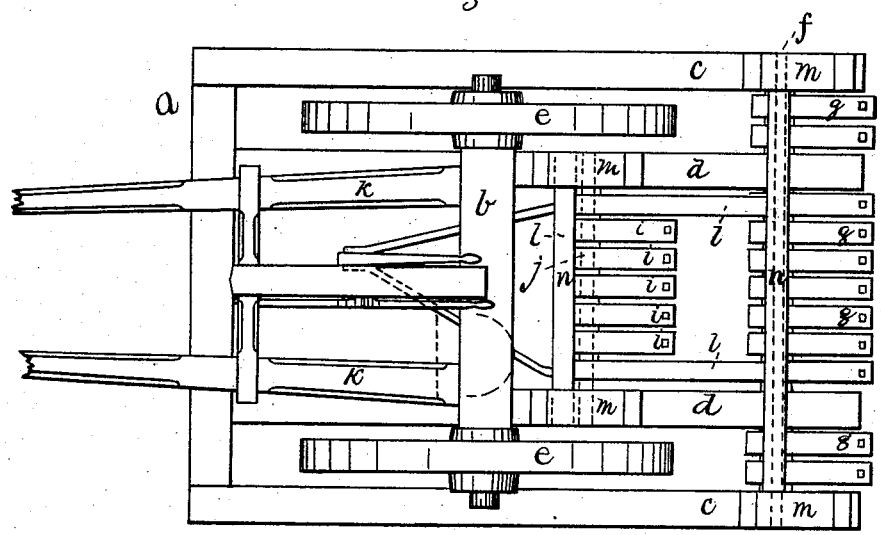
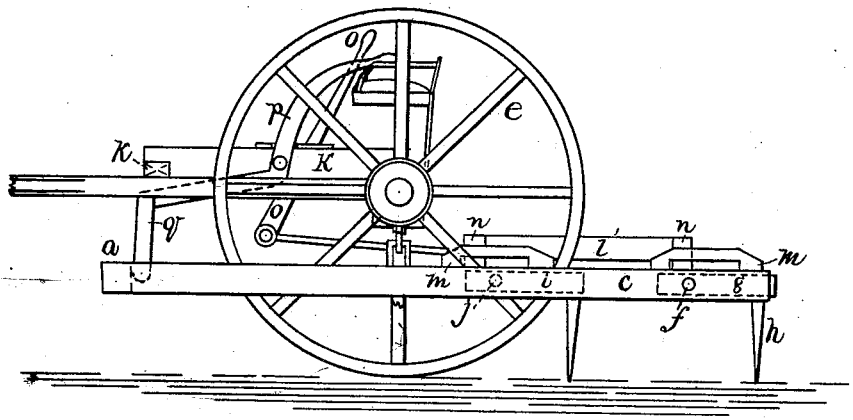
Fig. 1.

UNITED STATES PATENT OFFICE.

COLUMBUS BUSWELL, OF ETNA, MAINE.

IMPROVEMENT IN HARROWS.

Specification forming part of Letters Patent No. 163,736, dated May 25, 1875; application filed March 31, 1875.

*To all whom it may concern:*

Be it known that I, COLUMBUS BUSWELL, of Etna, in the county of Penobscot and State of Maine, have invented certain new and useful Improvements in Harrows; and I do hereby declare that the following is a full, clear, and exact description thereof, that will enable others skilled in the art to which it appertains to make and use the same, reference being had to the accompanying drawings, forming a part of this specification, in which—

Figure 1 shows a side elevation; Fig. 2 a plan of my invention.

My invention consists of an improved harrow designed to adapt itself readily to the inequalities of the ground, and capable of adjustment and adaptation while in operation, to soils of different characters or degrees of density or hardness. My harrow is suspended from wheels, its construction allowing the user to ride, and avoiding much of the fatigue attending this work, while it enables more to be done in a given time.

My invention will be understood by reference to the accompanying drawings.

At $a$ is shown a frame, provided with two sets of side pieces, $c\ c$ and $d\ d$, between which run the wheels $e$. The frame $a$ is suspended by means of links to the axle-tree $b$, in such a manner as to nearly balance itself. These links are so constructed as to allow some vertical play to the frame $a$, for reasons hereafter described. A rod, $f$, extends across the rear of the frame $a$, between the outer side pieces $c\ c$, upon which rod are hinged short arms or fingers $g$, each having an independent vertical motion on said rod, and each provided with a downwardly-projecting tooth, $h$. Similar arms or fingers $i$ are attached in like manner to a rod, $j$, extending across near the middle of the frame $a$, between the inner side pieces $d\ d$. The driver's seat is placed upon the axle-tree, which has also attached to it a frame, $k$, to receive the pole or thills. The independent action of the hinged teeth enables the machine to adapt itself to any irregularities of surface. For some purposes the weight of the teeth and fingers will cause them to enter the ground sufficiently, but when the soil is heavy, or where for any reason it is desired to harrow deep, additional weight is required.

To effect this, I provide a second frame, $l$, sliding in boxes $m$, upon the frame $a$. This frame $l$ is provided with cross-bars, $n$, extending across the frame $a$ from side to side, and is moved by means of a lever, $o$, attached to the frame $k$ of the axle-tree and within easy reach of the driver. When not required it is drawn forward, and its cross-bars do not affect the operation of the teeth. When it is required that the teeth should enter the ground more deeply or harrow more evenly the frame $l$ is thrown (by means of its lever) toward the rear of the machine, and its cross-bars $n$ are carried over the finger-bars of the teeth, holding them down. To increase still further the power of the teeth, I provide my harrow with devices by which the weight of the frame $a$ and its attachments may be thrown upon them, causing them to enter the ground more deeply. This frame $a$, as mentioned, is balanced or nearly so, so that its weight comes principally upon the axle-tree of the harrow, it being hung from said axle-tree by links at or near the middle of the frame. These links allow, as before stated, a slight vertical motion to the frame. In order to throw the weight of the frame upon the teeth I change the point of its suspension to the wheels, so that instead of hanging from the links near its middle it is suspended by a chain or link at its forward end, at the same time being raised so that its middle links do not bear any of the weight, the provision for vertical motion of the frame allowing this to be done. This change is made by means of a lever, $p$, attached to the axle-tree frame $k$, and connected by means of a chain or link, $q$, to the forward end of the frame $a$. When this lever is drawn back it raises the forward end of the frame, which is then attached to the wheels solely by the chain or link $q$, and its weight thrown on the teeth.

What I claim as my invention, and desire to secure by Letters Patent, is—

1. In a harrow, the combination of a balanced or nearly balanced frame, $a$, provided with one or more rods, $f\ f$, with independently-acting toothed finger-bars, hinged on said rods, as and for the purposes set forth.

2. In a harrow, the combination of a balanced frame, $a$, provided with one or more rods, $f\ f$, having toothed finger-bars hinged thereto with links, whereby said frame is suspended from its supporting-wheels, as herein set forth.

3. The combination of the frame $a$, provided with hinged tooth-carrying finger-bars, with the frame $l$ sliding thereon, and operating as set forth, for the purposes described.

4. The combination of the frame $a$, with its hinged tooth-carrying finger-bars, and frame $l$, with a lever $p$ and link or chain $q$, for changing the point of suspension of said frame $a$ from its middle to its front end, whereby the weight of said frame is thrown upon the teeth, as and for the purposes specified.

In testimony that I claim the foregoing, I have hereunto set my hand this 22d day of March, 1875.

COLUMBUS BUSWELL.

Witnesses:
WM. FRANKLIN SEAVEY,
J. W. PIERCE.